Jan. 11, 1955  D. C. SEDERSTROM  2,699,537
CONTROL AND INDICATING APPARATUS FOR ICING CONDITIONS
Filed Nov. 27, 1953
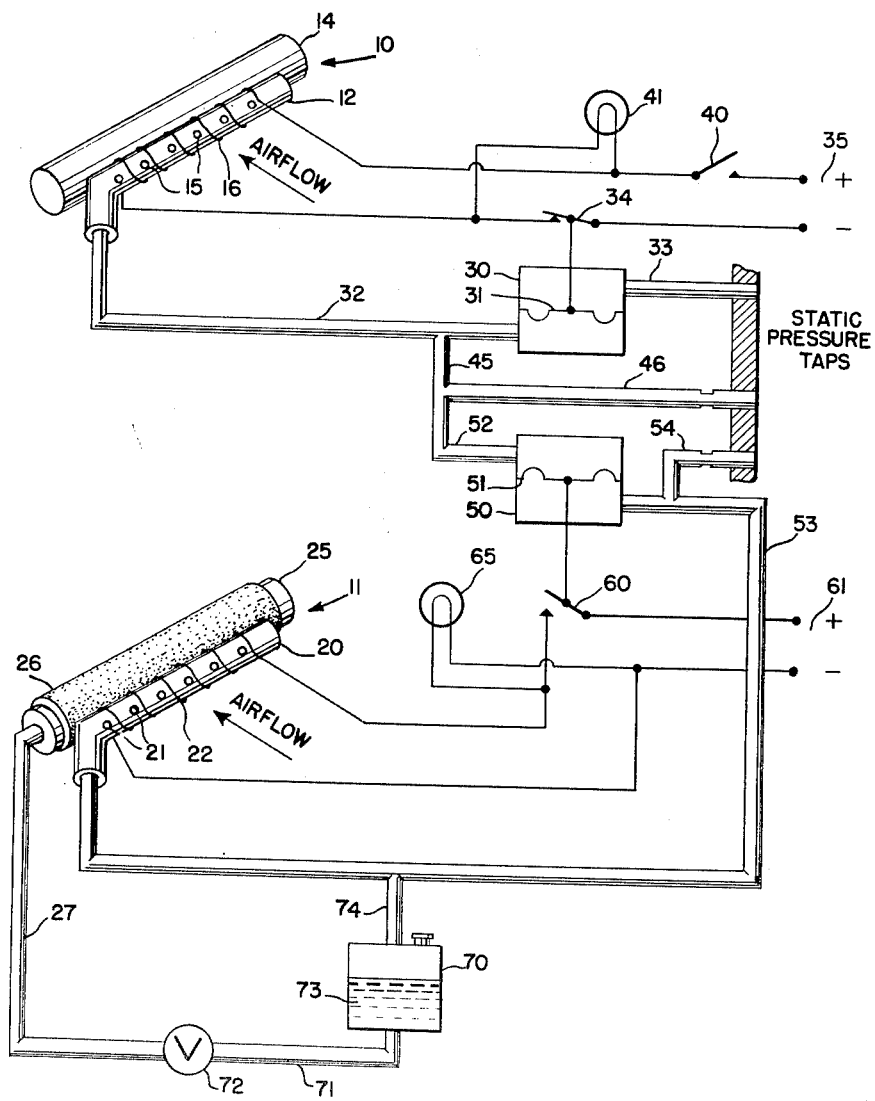
INVENTOR.
DEXTER C. SEDERSTROM
BY George H Fisher
ATTORNEY

United States Patent Office 2,699,537
Patented Jan. 11, 1955

2,699,537

CONTROL AND INDICATING APPARATUS FOR ICING CONDITIONS

Dexter C. Sederstrom, Minneapolis, Minn., assignor to Minneapolis-Honeywell Regulator Company, Minneapolis, Minn., a corporation of Delaware Application November 27, 1953, Serial No. 394,654

8 Claims. (Cl. 340—234)

The present invention is concerned with apparatus which is primarily intended for use on aircraft for anticipating the approachment of atmospheric conditions inducing the formation of ice on the aircraft. In particular, the invention is concerned with an improvement in the invention disclosed in the copending application of William W. Bursack, Serial No. 379,717 filed September 11, 1953.

In the modern aircraft having extremely high speeds and the power to rapidly change altitude, the need of a simple and dependable device for anticipating the formation of ice on the aircraft has been greatly recognized. The formation of ice can take place very rapidly and before a pilot would be aware of it, a disastrous condition can arise. This is especially applicable to high speed jet engine aircraft where the formation of ice in the cowling or intake would reduce the air flow to the engine to cause a reduction of engine power and a possible loss of all engine power.

Two geometrically similar pressure sensors are placed in the aircraft air stream such as in the intake of a jet engine aircraft. One of the sensors is cooled to a temperature below that of the other so that the cooled sensor will be the first to pick up ice when the aircraft enters an atmospheric condition in which such is possible. A pressure differential will develop between the two sensors, assuming only the cooled sensor picks up ice, indicating the possible approachment of icing conditions for the aircraft.

This invention is concerned with simple and dependable means of maintaining the temperature differential between the sensors at a predetermined value. A wick means for providing evaporative cooling of one sensor receives volatile fluid from a source which has a head pressure equal to the pressure developed in the cooled sensor. Regardless of the velocity or altitude of the aircraft, a sufficient amount of fluid will be furnished to the wick cooling means to provide a desired temperature differential between the sensors.

It is therefore an object of the present invention to provide an improved and less complex apparatus for anticipating an atmospheric icing condition for aircraft.

Another object of the present invention is to provide a plurality of pressure sensors one of which is maintained at a temperature lower than the ambient temperature by an improved and yet simple and dependable method so that a change in the atmospheric condition approaching atmospheric conditions indicative of icing of an aircraft can be detected by the formation of ice on the one sensor.

Another object of the present invention is to provide a plurality of pressure sensors one of which is maintained at a temperature lower than another by an evaporative cooling means to which fluid is fed depending on the pressure of that sensor so that a change in the atmospheric conditions approaching an atmospheric condition causing the formation of ice on the aircraft can be anticipated by the formation of ice on the same cooled sensor.

Other objects of the invention will be apparent from a consideration of the accompanying specification, claims and drawing of which;

The drawing is a schematic view of one embodiment of my invention.

Referring to the single figure, two geometrically similar pressure sensors 10 and 11, shown schematically, are to be positioned on the exterior of an aircraft in the air flow. More particularly, they are placed in the cowling or inlet of a jet engine aircraft. Wherever located the sensors are subjected to the same conditions of impact air temperature, air flow, water impingement, and altitude. Sensor 10 comprises a hollow cylindrical shaped member 12 mounted adjacent a second cylindrical member 14 which has no function except that of making the two sensors 10 and 11 geometrically similar. Member 12 has a plurality of aligned laterally spaced holes 15 for receiving impact air. An electrical heating element 16 is mounted on member 12 in a heat transferring relation so that upon the icing of sensor 10 heating element 16 can be energized by a circuit to be described later to melt off the ice which plugs up the holes 15.

Sensor 11 also comprises a hollow cylindrical member 20 having a plurality of holes 21 for receiving impact air and a heating element 22 mounted thereon. Mounted adjacent member 20 is a second hollow cylindrical member 25 surrounded by a porous sintered material 26 which provides a wick or evaporative cooling means to which a volatile liquid is supplied through member 25 by an inlet conduit 27. As air passes over sensor 11, evaporation of the volatile liquid seeping through material 26 takes heat away from sensor 11 to reduce its temperature below the temperature of sensor 10.

A pressure responsive operator 30 is connected by a conduit 32 to member 12 of sensor 10 and to a static pressure tap by conduit 33 so that the pressure developed in sensor 10 is applied to one side of diaphragm 31 in operator 30 and the static pressure is applied to the other. Static pressure taps are commonly used in aircraft. The pressure responsive operator 30 controls a switch 34 that is connected in the power feed lines which connect heating element 16 to a source of power 35. Also connected in the power feed line circuit is a main switch 40. If there is no pressure exerted on diaphragm 31 by sensor 10 switch 34 remains closed to cause energization of the heating element 16 and an indicator light 41 connected in parallel with the heating element. Sensor 10 is also connected to a static pressure tap by a conduit 45 connected to conduit 32 and a restricted conduit 46; this connection bleeds the air from the sensor when holes 15 seal up with ice with an existing high pressure inside member 12.

A second pressure responsive operator 50 is connected to sensor 10 by a conduit 52 and sensor 11 by a conduit 53 so that the pressures developed in the respective sensors are applied to opposite sides of a diaphragm 51. Conduit 53 is also connected to a static pressure tap by a restricted conduit 54 providing a similar function as conduit 46 mentioned above. Pressure operator 50 is connected to a switch 60 that controls the supply of power to the heating element 22 from a source of power 61 which is similar to the power source 35. When the developed pressures of sensors 10 and 11 are zero or equal switch 60 is open to render heating element 22 ineffective. Connected in parallel with heating element 22 is a second indicator light 65 which is also energized when switch 60 is closed.

The supply of volatile fluid to the wick or sintered material 26 is provided by a tank or container 70 that is connected to member 25 through a conduit 71, a valve 72, and conduit 27. The valve provides for the control of the flow of fluid and is regulated to maintain the desired temperature depression of sensor 11 below the temperature of sensor 12. A head pressure is placed on the liquid or fluid 73 in tank 70 by the connection of pressure sensor 11 to the tank through conduit 74, this head pressure developing when the air flow through holes 21 develops a pressure in member 20.

The pressure developed in sensor 11 and reflected to the top of coolant supply tank 70 will vary with speed of the aircraft; that is, at high speeds the dynamic pressure would be high and the supply of fluid would increase over that at low speeds. This is desirable since the required cooling is greater at high speeds due to the increase in ram temperature.

It is well known that the rate of evaporation of a volatile fluid is proportional to the vapor pressure of the fluid at the evaporative surface and the vapor pressure of the fluid in the free air stream; however, since the coolant is a liquid other than water there will be none of its vapor in the air, therefore the rate of evaporation will be proportional to the vapor pressure of the liquid. As the vapor pressure is not changed by the air pressure, changes in ambient pressure due to altitude changes will have substantially no effect on the rate of evaporation.

The change in temperature depression between the two sensors due to the lowering of the ambient temperature is reduced to some extent by the increase in latent heat of vaporization. As the temperature decreases, it is well known that the rate of evaporation of a volatile fluid will decrease; however, at the same time the latent heat of vaporization increases, and the temperature depression is dependent on the product of the two.

The coolant supply needs to have little control with the exception of the initial adjustment of valve 72 so that the proper temperature depression, that is the temperature differential between sensors 10 and 11, can be maintained. This coolant apparatus will be effective as long as sensor 11 receives impact air; however, upon icing the pressure in member 20 will be reduced and the cooling apparatus will be rendered ineffective thus reducing the amount of heat needed to be supplied by element 22 to melt the ice from sensor 11.

Operation

With sensors 10 and 11 mounted on the exterior of the aircraft no pressure is developed in members 12 and 20 when the aircraft is on the ground and pressure responsive operator 30 closes switch 34 and pressure responsive operator 50 holds switch 60 open. Upon the initial operation of the ice anticipating network, switch 40 is closed to energize heating element 16 and indicator light 41. As the aircraft begins to increase in speed the pressures in sensors 10 and 11 increase and if nothing is restricting the flow of air through holes 15 and 21 switch 34 opens to deenergize the indicator light 41 and switch 60 remains open. It is obvious that if switch 34 did not open some fault would be detected in the network and as the pressure on each side of the diaphragm 51 of pressure operator 50 must be equal to maintain switch 60 open a defect in the sensor 11, such as the restriction of holes 21, would cause an operation of switch 60 to turn on the indicator light 65.

The pressure developed by sensor 11 is applied to the head of the liquid in tank 70 so that a varying amount of volatile fluid is delivered to the wick. The evaporation of the volatile liquid from member 26 reduces the temperature of the sensor 11 below the temperature of sensor 10 so that a substantial temperature differential exists between the two sensors. Upon the approachment of an atmospheric condition which could cause icing on the aircraft sensor 11 would begin to ice up and upon the restriction of holes 21 switch 60 is closed by pressure operator 50 and the supply of coolant to the sensor is interrupted. At the same time indicator light 65 is energized and heater 22 begins to heat the sensor to melt off the ice previously formed. As soon as the ice is melted switch 60 opens and the volatile fluid is again delivered to the sensor 10 to establish the operation previously mentioned; however, upon the continued existence of the atmospheric conditions causing icing on sensor 11 the cycle would be repeated to cause intermittent energization of the indicator light 65. Such a signal informs the pilot of the aircraft that he is flying in atmospheric conditions in which a slight change in such conditions or in the craft's flight conditions might cause icing on his aircraft. For example, if the aircraft is flying at a speed where the ram temperature rise was sufficient to maintain surfaces of the craft above freezing even though he was in atmospheric conditions for icing, a reduction in speed quite possibly would bring on icing of the craft.

Assume that sensor 10 begins to ice up and the pressure in the sensor is decreased, switch 34 would then close to energize the indicator light 41 as well as the heater 16 which would heat up the sensor 10 and melt off the ice. As with sensor 11, a cycle of operation would develop and the indicator light 41 would be intermittently operated informing the pilot of the aircraft that icing is taking place on his craft and that the de-icing equipment should be placed in operation.

The depression of the temperature of sensor 11 as compared to that of sensor 10 is dependent on the product of the vapor pressure and the latent heat of vaporization of the liquid and is independent of variations of ambient pressure due to altitude changes. The vapor pressure decreases with a decrease in temperature, but at the same time the heat of vaporization increases, and the temperature depression therefore tends to remain relatively constant.

While the invention is shown controlling indicating lights it is obvious that such an apparatus could be connected into conventional de-icing equipment on an aircraft so that upon the existence of icing on sensor 10 the de-icing equipment would be energized to prevent icing of the aircraft proper. These and other modifications are to be limited only by the scope of the appended claims.

I claim as my invention:

1. In apparatus for anticipating an icing condition for aircraft, first and second pressure sensor means each comprising a hollow cylindrical member having a plurality of laterally spaced holes for receiving air when said sensor means is located in the air stream of the aircraft; a first and a second resistance winding, each of said windings being wound around said first and second sensor means, respectively; wick means spaced adjacent and in heat transferring relation to said second sensor means; supply means for furnishing a varying quantity of volatile fluid to said wick means so that upon the evaporation of said fluid from said wick means heat will be removed from said second sensor means to lower the temperature of said second sensor means relative to the temperature of said first sensor means, said supply means comprising a tank and an associated valve connected to said wick means, said tank being connected to said second pressure sensor means so that pressure resulting from the air entering into said sensor through said holes is impressed on said fluid in said tank to maintain a supply of fluid to said wick means; a static pressure source; first differential pressure actuated switch means; conduit means connecting said switch means to said static pressure taps and said first sensor means; second differential pressure actuated switch means, second conduit means connecting said second switch means to said first and second sensor means; first indicating means; first electrical connection means connecting said first switch means in controlling relation to said first resistance and said first indicating means; second indicating means; and second electrical connection means connecting said second switch means in controlling relation to said second resistance and said second indicating means.

2. In apparatus for anticipating an icing condition for aircraft, first and second geometrically similar pressure sensor means located in the airstream of the aircraft, each of said sensors having heating means; cooling means associated with said second sensor, said cooling means comprising a source of volatile fluid; variable flow control means; evaporative cooling means associated with said second sensor means and conduit means connecting said source through said flow control means to said evaporative cooling means; further conduit means connecting said source to said second sensor means so that the pressure of said second sensor means is applied to said source to maintain a flow of fluid to said evaporative cooling means proportional to the air inlet pressure of said sensor means, means responsive to the pressure of said first sensor means, and second means responsive to the pressure differential of said first and second sensor means.

3. In apparatus for anticipating an icing condition for aircraft, first and second pressure sensor means; first and second heating means adapted for heating said first and second sensor means, respectively; cooling means adapted to maintain a predetermined temperature difference between said first and second sensor means, said cooling means comprising means responsive to the pressure of said second sensor means for regulating its capacity; and first and second condition responsive means, said first condition means being responsive to said first sensor means, said second condition means being responsive to said first and second sensor means.

4. In apparatus for anticipating an icing condition for aircraft; a plurality of pressure probes extending into the air stream of an aircraft for sensing total pressure, one of said probes having heating means and cooling means; control means including said one of the pressure probes for controlling said cooling means to maintain a predetermined temperature differential between said first and second probes; a static pressure source; and pressure responsive control means for controlling said heating means responsive to the difference between and the total pressure of said first and second probes.

5. In apparatus for anticipating an icing condition for aircraft, first condition responsive means, second condition responsive means, heating means and cooling means for said second condition responsive means, control means including the output of said second responsive means for controlling said cooling means to maintain a predetermined temperature differential between said first and second responsive means, and condition indicating means including said heater means for anticipating a change in the conditions affecting said second condition responsive means.

6. In apparatus for anticipating a change in conditions, first condition responsive means, second condition responsive means, cooling means, temperature control means including said second condition responsive means for controlling said cooling means to maintain a predetermined temperature differential between said first condition responsive means and said second condition responsive means, control means, and connection means connecting said first and second condition responsive means in controlling relation to said control means.

7. In apparatus for anticipating an icing condition for aircraft, first and second pressure sensor means, cooling means, control means for controlling said cooling means, said control means comprising means responsive to the pressure of said second sensor means thereby varying the capacity of said cooling means to maintain a predetermined temperature difference between said first and second sensor means, and first pressure responsive control means, said first control means responsive to the pressure differential between said first and second sensor means so that upon the approachment of atmospheric conditions indicative of icing said second sensor means will be iced and said cooling means will be rendered ineffective.

8. In apparatus for anticipating an icing condition for aircraft, first pressure sensor means, second pressure sensor means, cooling means associated with said second sensor means, said cooling means comprising wick means to which a quantity of volatile fluid is delivered and the rate of evaporation of said fluid determines the cooling capacity, said fluid being delivered from a source that is responsive to the pressure of said second sensor means thereby increasing the cooling capacity when the pressure of said second sensor means increases, condition indicating means, heating means associated with said second sensor means, condition responsive means responsive to the differential pressure between said first and second sensor means, and means connecting said heating means and said condition indicating means to said condition responsive means.

References Cited in the file of this patent

UNITED STATES PATENTS

| Number | Name | Date |
| --- | --- | --- |
| 2,541,512 | Hahn | Feb. 13, 1951 |
| 2,656,525 | Kinselea | Oct. 20, 1953 |

FOREIGN PATENTS

| Number | Country | Date |
| --- | --- | --- |
| 626,543 | Great Britain | July 18, 1949 |